United States Patent [19]

Oplatka

[11] 4,400,946

[45] Aug. 30, 1983

[54] SOLAR THERMAL POWER PLANT

[75] Inventor: Georg Oplatka, Zurich, Switzerland

[73] Assignee: BBC Brown, Boveri & Company Limited, Baden, Switzerland

[21] Appl. No.: 172,696

[22] Filed: Jul. 28, 1980

[30] Foreign Application Priority Data

Sep. 7, 1979 [CH] Switzerland ............... 8077/79

[51] Int. Cl.³ .................................... F03G 7/02
[52] U.S. Cl. ............................ 60/641.8; 60/659
[58] Field of Search ............ 126/433, 437; 60/641.8, 60/641.11, 641.15, 659

[56] References Cited

U.S. PATENT DOCUMENTS

| 4,164,123 | 8/1979 | Smith ..................... | 60/641.11 |
| 4,213,303 | 7/1980 | Lane ...................... | 60/641.15 |
| 4,220,138 | 9/1980 | Bottum .................... | 126/433 |

*Primary Examiner*—Allen M. Ostrager
*Attorney, Agent, or Firm*—Werner W. Kleeman

[57] ABSTRACT

A solar thermal power plant containing a heliostat field and a collector system mounted upon a tower or column, the radiation receivers of the collector system being structured to be elongate, preferably circular ring sector-shaped and extending over part of the circumference of the crown or top of the tower. The removal of steam is accomplished directly or indirectly from a hot water storage which is alternately or overlappingly charged and discharged. According to one embodiment there are provided three heat receivers, two of which serve for charging and discharging the hot water storage, whereas in the third receiver there is directly generated steam for the compensation of time periods devoid of sun.

8 Claims, 7 Drawing Figures

4,400,946

SOLAR THERMAL POWER PLANT

BACKGROUND OF THE INVENTION

The present invention relates to a new and improved construction of a solar thermal power plant.

Generally speaking, the solar thermal power plant of the invention is of the type comprising a radiation receiver installed at a tower or column and a heliostat field whose mirrors or reflectors direct the incident solar radiation in a concentrated or focused manner upon the radiation receiver. Also, there is provided a hot water storage for the storage of the work medium which is heated to the operating temperature and devices serve for the thermal charging and discharging of the hot water storage.

With the heretofore known power plants of this type, which also are designated as column or tower designs, there are employed mirrors or reflectors which are controlled as a function of the position of the sun. The totality of these mirrors or reflectors form a heliostat field and direct the solar radiation in a concentrated fashion onto a radiation receiver installed at a tower. The radiation receiver contains absorber elements which convert the received radiation into thermal energy or heat and deliver such to a work medium which is circulated through a pipe system. The absorber elements are generally internally blackened hollow bodies open at one side and through whose opening there can arrive the concentrated radiation beam. They form an almost ideal black body, so that practically the entire incident radiation is utilized for generating heat. The work medium transports the heat which has been taken-up to steam generators installed at the ground, which supply in conventional fashion turbo-generators for generating electrical energy.

The efficiency of the collector system composed of the heliostat field and the radiation receiver, apart from being dependent upon the temperature of the radiation receiver, markedly depends upon the degree of concentration of the radiation at the receiver. It increases to a great degree as a function thereof, so that there are strived for high degrees of concentration which, however, require large and heavy receivers.

SUMMARY OF THE INVENTION

Therefore, with the foregoing in mind it is a primary object of the present invention to overcome such drawback of the heretofore known constructions of solar energy power plants.

A further important object of the present invention resides in providing storage circuits which enable a continuous operation of the power plant even during periods of time when the sum is not present, and there is employed as the medium for the heat transport, the direct work output and the storage one and the same liquid, and specifically water, so that there can be obtained economical and operational advantages in relation to other proposed two material circulation systems or cycles.

A further significant object of the present invention aims at avoiding the previously discussed drawbacks of the heretofore proposed installations functioning according to the tower concept.

Now in order to implement these and still further objects of the invention, which will become more readily apparent as the description proceeds, the solar thermal power plant of the present development is manifested by the features that the radiation receiver has an elongate or lengthwise extended shape and is subdivided into a multiplicity of partial receivers. Moreover, the devices for charging and discharging the hot water storage contain at least the following means:

a throttle element arranged after the hot water container for reducing the pressure for the purpose of generating steam from the heated water;

a pre-heater installation arranged following the condenser and the condensate pump and heatable by bled steam by means of intermediate stage taps;

a cold water container for receiving that water which has not been converted during throttling into steam, and a water return flow line serves for withdrawal of such water back into the cold water container; and a conveying conduit and line means for maintaining the water flow during the charging operation.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figures 1, 2:
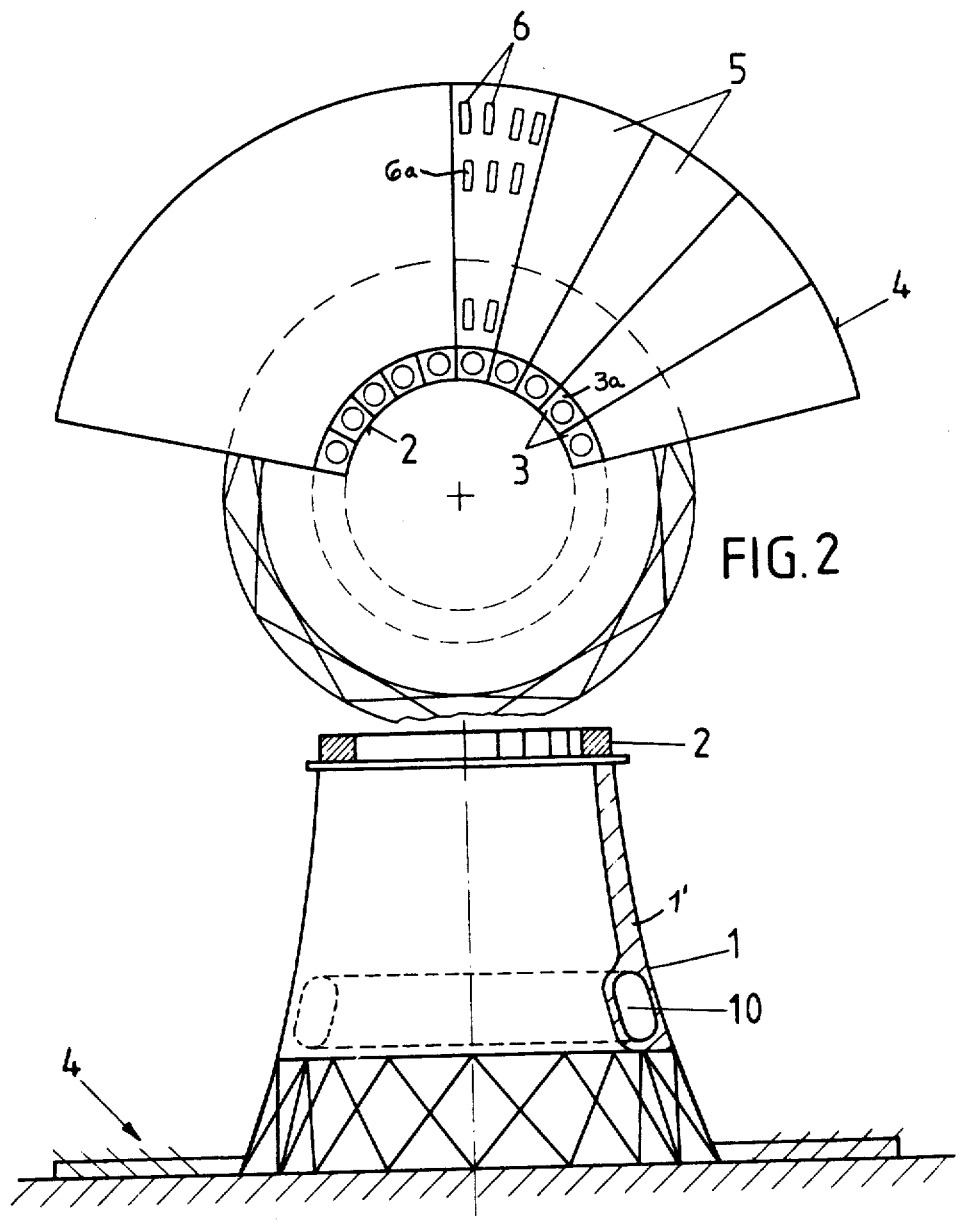
FIG. 1 is an elevational view of a heliostat field containing a cooling tower or column which serves as a support structure for an inventive radiation receiver and constitutes a component of the inventive solar thermal power plant.
FIG. 2 is a top plan view of the arrangement of FIG. 1.

Describing now the drawings, FIG. 1 illustrates a conventional dry cooling tower 1 at whose crown or apex there is arranged a radiation receiver 2 in the form of an approximately circular ring sector arranged about half of the tower circumference. This radiation receiver 2 receives the light energy which is concentrated and reflected by the heliostat 6 of a heliostat field 4 onto the radiation receiver 2. The radiation receiver 2 is subdivided, in turn, into a row of partial receivers 3 which contain conventional absorber elements, generally indicated by reference character 3a, where the radiation is converted into heat or thermal energy which is then delivered to water which flows through conventional cooling tubes arranged at the rear side of the absorber elements 3a. By means of the water which has been heated in this manner there is generated steam, in a fashion as will be described more fully hereinafter, this steam then being used to produce work in a conventional steam turbine.

The concentration of the solar radiation at the radiation receiver 2 is accomplished by the heliostat field 4 which is subdivided into sectors 5 operatively associated with the individual partial receivers 3. These sectors 5 contain the rows of heliostats 6 arranged concentrically with respect to the lengthwise axis of the cooling tower 1, and the solar reflective surfaces 6a of the heliostats 6 are preferably constructed as parts of parabloid or spherical surfaces and in conventional manner can be controlled so as to move about two axes as a function of the position of the sun so that the solar radiation always can move into the openings of the absorber elements 3a.

The totality of the cooling pipes, through which flows the work medium and serving to remove the heat of the absorber elements as well as the related collecting chambers at common inlets and outlets of the cooling pipes or tubes will be referred to hereinafter as the heat receiver.

So that the energy received by the absorber elements 3a can be taken-up by the work medium, wherein here there is employed as the work medium water, without forming steam, the work medium therefore must be maintained under pressure. Practical values of pressure and temperature are, for instance, 10 bar and approximately 180° C. The water which is heated up in the heat receiver by the absorber elements 3a either directly arrives by means of a collecting line at a hot water storage, from which there is then removed the water for generating steam, or, however, it is circulated into a closed primary cycle and then conducted through a heat exchanger where it delivers the heat to water circulating in a secondary cycle or circuit which is separated from the primary cycle or circuit. In the secondary circuit there is produced in the same manner as in the first case steam for driving the turbine.

Figure 3:
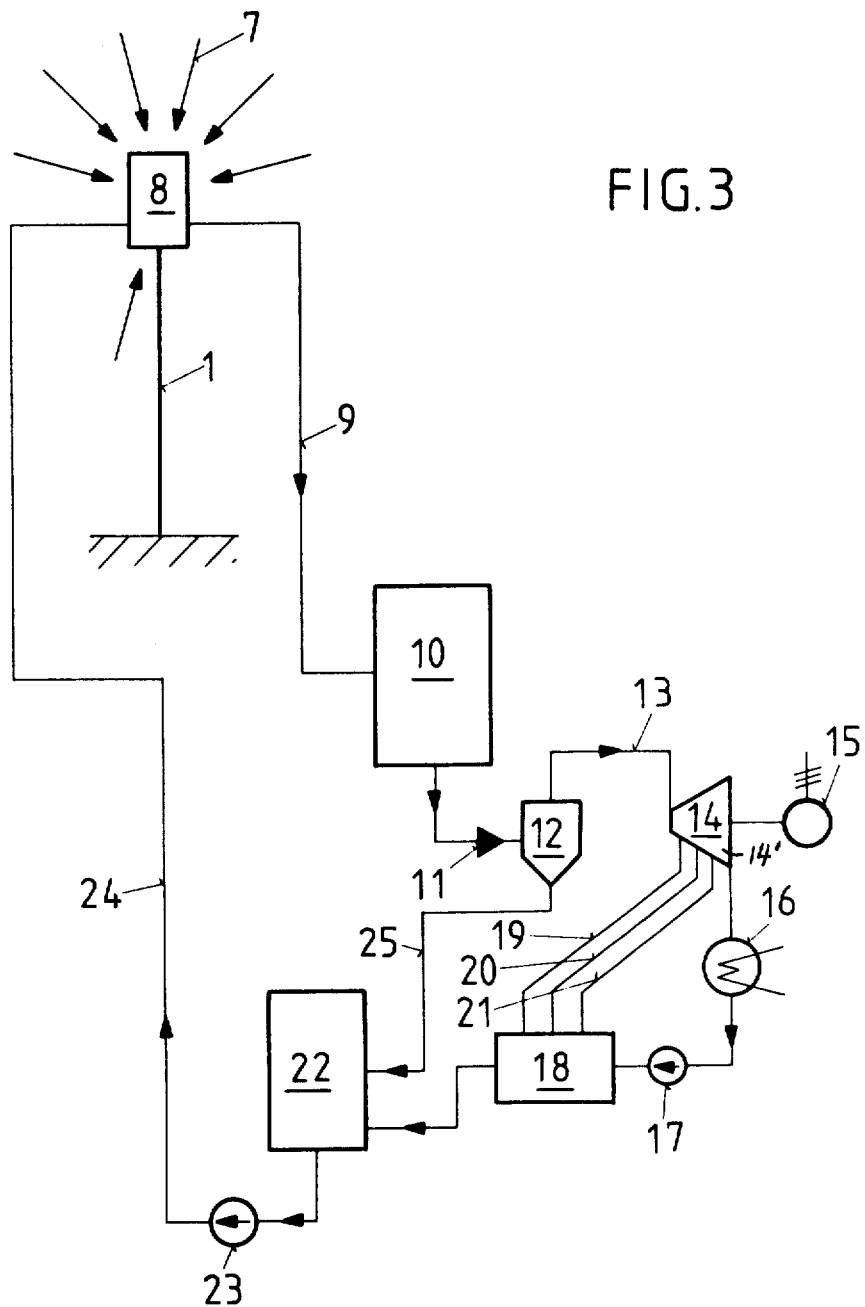
FIG. 3 is a schematic circuit diagram of a first embodiment of inventive solar thermal power plant containing a single fluid circulation or cycle.
Figure 4:
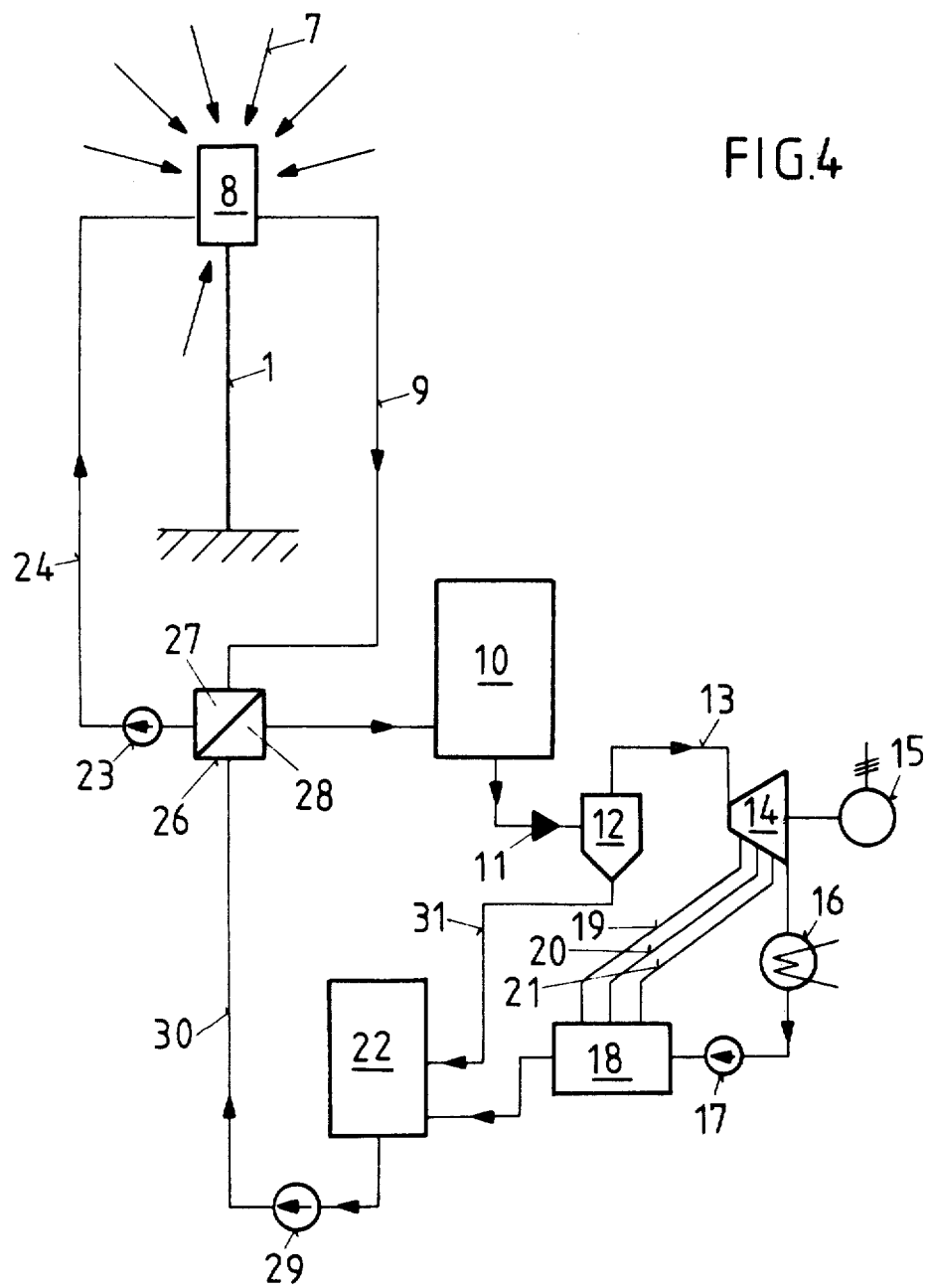
FIGS. 4 and 5 illustrate two embodiments containing a primary circuit and a secondary circuit.
Figure 5:
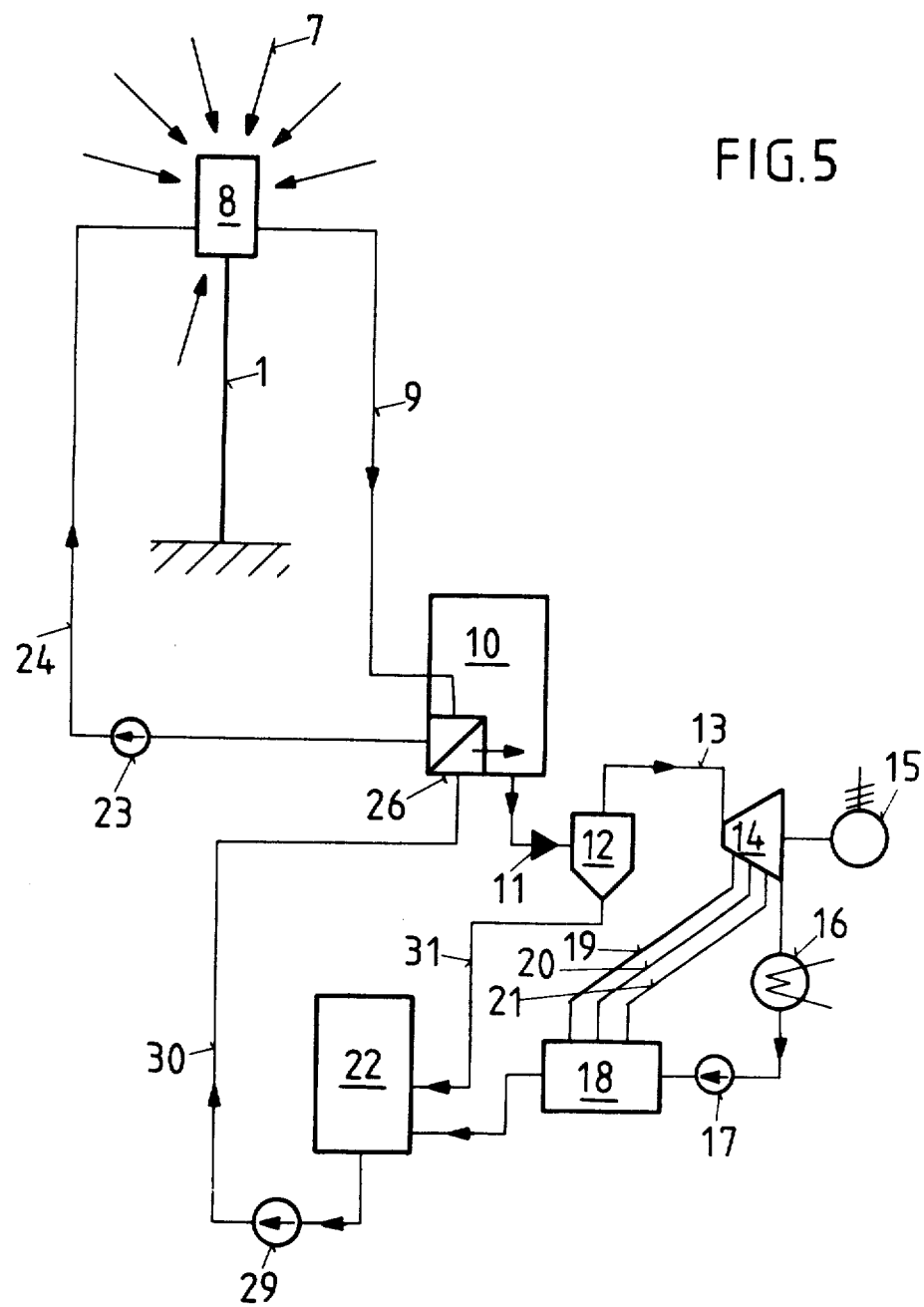

Installations of the first type containing only one cycle or circulation, wherein FIG. 3 shows a possible embodiment thereof, have the drawback that the hydrostatic pressure, which is considerable in view of the great height of the tower, loads the entire cycle or circuit. With the installations of the second type, wherein FIGS. 4 and 5 illustrate two embodiments, the secondary circuit is separated by the heat exchanger from the primary circuit, and consequently, relieved of the hydrostatic pressure, so that the installation components can be designed to be lighter in weight and strength.

Turning attention now to FIG. 3, reference character 1 designates the tower or column wherein, just as was the case for the arrangement of FIG. 1, such constitutes a cooling tower or, however, another suitable type of tower construction, for instance designed as a prestressed concrete or truss or framework structure. The arrows 7 symbolically represent the solar radiation which is concentrated by the heliostat field 4 at the radiation receiver 2, as previously explained in conjunction with FIG. 1. From the schematically illustrated heat receiver 8 to which there has been delivered the heat or thermal energy received by the absorber elements 3a due to the action of the solar radiation, there is conducted out of such heat receiver 8 water through a collecting line or pipe 9 into a hot water storage 10. The water departs by means of a throttle element or throttle 11 out of the hot water storage 10 and arrives at an expansion vessel 12 where it partially is converted into steam because of the lower pressure which prevails within the expansion vessel 12. The steam is then conducted by means of a steam line 13 to a steam turbine 14 which drives an electric generator 15. The exhaust steam which flows out of the end stage 14' of the turbine 14 condenses in a condenser 16, and the condensate formed in the condenser 16 is fed by means of a condensate pump 17 to a preheater installation 18. Within the preheater installation 18 the condensate is heated-up further beyond the condensate temperature by means of bled or tapped-off steam which is removed by means of the intermediate stage-taps or bleed lines 19, 20, 21 from the turbine 14.

As illustrated in FIG. 1, the hot water storage 10 can be constructed in a space saving manner while simultaneously affording large storage volumes if it is designed as a torus-shaped ring container and is accommodated within the shell or jacket 1' of the cooling tower 1.

From the preheater installation 18 the condensate is fed to a cold water storage 22 which also takes-up the water which has been separated in the expansion vessel 12. A return feed pump 23 conveys the preheated feedwater out of the cold water storage 22 by means of a return flow line 24 back into the heat receiver 8. The circulation or cycle is therefore closed.

With long lasting daily insulation it is possible in this manner to carry out a continuous operation, the maintenance of which is dependent upon, apart from the duration of the shining of the sun, predominantly the absorber surfaces and the capacity of the hot water storage 10 and the cold water storage 22.

Depending upon the intensity and the course as a function of time of the solar radiation it is possible to differentiate between two sharply separate or overlapping operating periods, wherein the latter is to be construed as the normal case. Here, during such time as there is removed water or steam for driving the steam turbine 14 out of the hot water storage 10 by means of the expansion vessel 12, there is simultaneously replenished the water supply of the hot water storage 10 by heated water which inflows to the hot water storage 10 from the heat receiver 8. Therefore, there is present a continuous operation with simultaneous charging and discharging of the hot water storage 10.

Following an elapsed period of time during which the solar radiation was sufficient for charging the hot water storage 10 the further solar thermal flow is not adequate for a sufficient heating of the work medium, as would be the case during periodic clouding, or in the event the operation of the power plant must be carried out twentyfour hours of a day, then the discharging of the hot water storage 10 can be continued for a period of time which is dependent upon its storage capacity. With favorable meteorological conditions it is possible, in this manner, to design such solar thermal power plant for continuous operation.

With this variant design it is possible to define with a single, closed work medium cycle two circuits, a respective one for the charging and the discharging periods, of which the circuit for the charging will be referred to hereinafter as the charging circuit which takes-up the complete throughput of the work medium, whereas the second circuit, defining the discharging circuit for driving the turbine, has flowing therethrough a part of the total work medium which is dependent upon the power consumption of the turbine 14.

The discharging circuit which is active during the discharging periods encompasses the path leading out of the hot water storage 10, through the throttle 11, to the expansion vessel 12, from that location to the steam turbine 14, the condenser 16 and the pump 17 leading to the pre-heating installation 18 and the path to the cold water storage 22. At that location the discharge circuit branching off of the hot water storage 10 merges into the charging circuit which takes-up the complete throughput of the work medium. The main components of the charging circuit comprise the cold water storage 22, the return feed pump 23, the return flow line 24, the heat receiver 8, the collecting line 9, the hot water storage 10, the throttle element 11, the expansion vessel 12 and a water return flow line 25, which closes the charging circuit.

With this embodiment there is common to the charging circuit and the discharging circuit the hot water storage 10, the throttle element or throttle 11 and the expansion vessel 12. With the next following to be discussed embodiment, as illustrated in FIG. 4, both of these circuits are separated by a heat exchanger 26. As already mentioned, this construction affords the advantage that the components of the discharging circuit are relieved of the static pressure due to the elevationally situated heat receiver 8, and therefore, can be designed cheaper and lighter in weight. The charging circuit consists of the heat receiver, the collecting line or conduit 9, the primary side compartment or chamber 27 of the heat exchanger 26, the return flow pump 23 and the return flow line or conduit 24.

The discharge or discharging circuit additionally contains apart from the components which are common to the embodiment illustrated in FIG. 3 and wherein there have been conveniently used for the same or analogous components the same reference characters, the following components: the secondary side chamber or compartment 28 of the heat exchanger 26, a return flow pump 29, a return flow line 30 as well as a water return flow line 31. The water return flow line 25 of the embodiment of FIG. 3, corresponding to the water return flow line 31, in the arrangement of FIG. 3 is to be considered as part of the charging circuit, whereas the water return flow line 31 of the arrangement of FIG. 4 so-to-speak constitutes an auxiliary flow branch in the discharging circuit which is independent of the charging circuit.

The embodiment illustrated in FIG. 5 essentially corresponds to that shown in the arrangement of FIG. 4, with the exception that for the purpose of saving space and reducing the thermal losses the heat exchanger 26 is arranged within the hot water storage 10.

Figure 6:
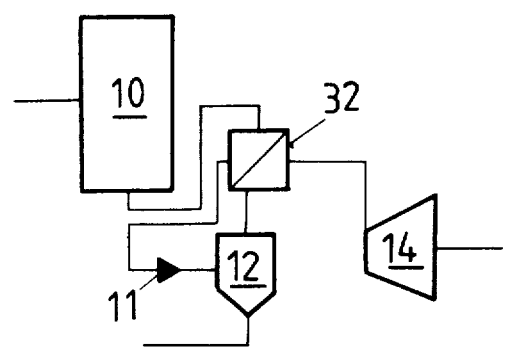
FIG. 6 illustrates an arrangement of a super-heater in the fluid circulation or cycle of the installation or plant.

FIG. 6 illustrates a possible arrangement of a superheater in the discharge circuit. The vapor which develops in the expansion vessel 12 arrives at the heat exchanger 32, where it is super-heated by the hot water flowing out of the hot water storage 10 into the expansion vessel 12 in counter current flow.

With the heretofore described structural variants the hot water storage 10 has removed therefrom water from which there is separated-out steam in the expansion vessel 12. With the arrangement illustrated in FIG. 7 the removal of steam is accomplished directly out of the hot water storage 10. Here, there is not provided any expansion vessel. This installation possesses three heat receivers 32, 33, 34, each of which have different functions. Advantageously, each heat receiver is operatively associated with a sector of the radiation receiver 2 and which sector corresponds to the capacity of the related heat receiver.

The circuit arrangement of this installation is more complicated than that of the above-described installations and will be best understood from the following description as to its mode of operation. Initially, there will be considered the discharge operation.

There is started with the condition where the hot water storage 10 is completely charged, and at the same time the cold water storage 22 is empty. A valve 35 provided between the throttle element 11 and the steam turbine 14 is open, so that steam can flow out of the hot water storage 10 into the turbine 14, this steam condensing thereafter within the condenser 16. The condensate is conveyed by a condensate pump 17 to a condensate collector 37. During this operating phase there remains closed a valve 36 which is arranged in a steam infeed line 38 between the heat receiver 34 and the turbine 14. The throttle element 11, during the discharging operation, maintains constant the turbine inlet pressure. As soon as the pressure in the hot water storage 10 has dropped to this value, then the energy which is available from such hot water storage 10 is consumed and, as will be explained more fully hereinafter, the storage 10 must be recharged.

The charging process occurs in three operations in the following manner: A condensate pump 39 provided after the condensate collector 37 conveys a part of the condensate to the heat receiver 33, whereas a second condensate pump 40 conveys a further part of the condensate by means of a preheater installation 18, where there is preheated the condensate by the bled steam removed from the intermediate stage bleed or tap lines 41 and 42, through a water return flow line 43 into the heat receiver 34. The heat receiver 34 heats-up the water and the generated steam, as the case may be, whereafter following opening of the valve 36 and closing of the valve 35 there is maintained the operation of the turboset. During this charging operation the turbine 14 receives steam by means of the steam infeed line 38 directly from the heat receiver 34 which is designed for continuous steam generation during solar radiation. Also, in this cycle or circuit of the installation there is provided a throttle element 44 for maintaining constant the turbine inlet pressure.

To charge the hot water storage 10 there are provided both of the heat receivers 32 and 33. The water remaining in the hot water storage 10 is withdrawn into the cold water storage 22 and at that location is forced by means of a return flow pump 45 into the heat receiver 32 where it is heated and then stored in the hot water storage 10. The second heat receiver 33 serves for charging in that the pump 39 conveys condensate out of the collector 37 and feeds such by means of a water return flow line 46 into such heat receiver 33. From the heat receiver 33 the heated water is either delivered directly by means of the lines or conduits 47, 48 into the hot water storage 10 or, however, initially infed by means of the line which is composed of the solid drawn line section 47 and the broken line illustrated line section or conduit 49, into the cold water storage 22 from where it then is forced by the pump 45 into the first heat receiver 32 and at that location first heated-up to the storage temperature. The line or conduit section 48, with this embodiment, is omitted. In accordance with the selected variant constructions there should be correspondingly designed the outputs of the two receivers 32 and 33. In the last-mentioned case, the heat receiver 32 is to be dimensioned larger, since it also must take-up the throughput of the heat receiver 33.

After completion of the charging period the entire quantity of water, which has been brought to the starting conditions of temperature and pressure, is located within the hot water storage 10, whereas the cold water storage 22 has been completely emptied and the condensate collector 37 partially emptied.

With this circuit configuration all three of the heat receivers 32, 33 and 34 are heated in the presence of sunshine, and in this phase the heat receiver 34 directly delivers steam for the turbine 14. On the other hand, at the same time the heat receivers 32 and 33 fully charge the hot water storage 10 in order to bridge the following phase where there is not present any sunshine, so that a continuous operation is possible.

Just as was the case for the variant embodiments illustrated in FIGS. 4 and 5, also with this circuit design it is possible to limit the static pressure, by virtue of the highly elevationally situated heat receivers 32, 33 and 34, by heat exchangers arranged between the corresponding circuits or cycles, to the heated part of the installation and in similar fashion, as at such location, there are also possible the use of superheater circuits.

Figure 7:
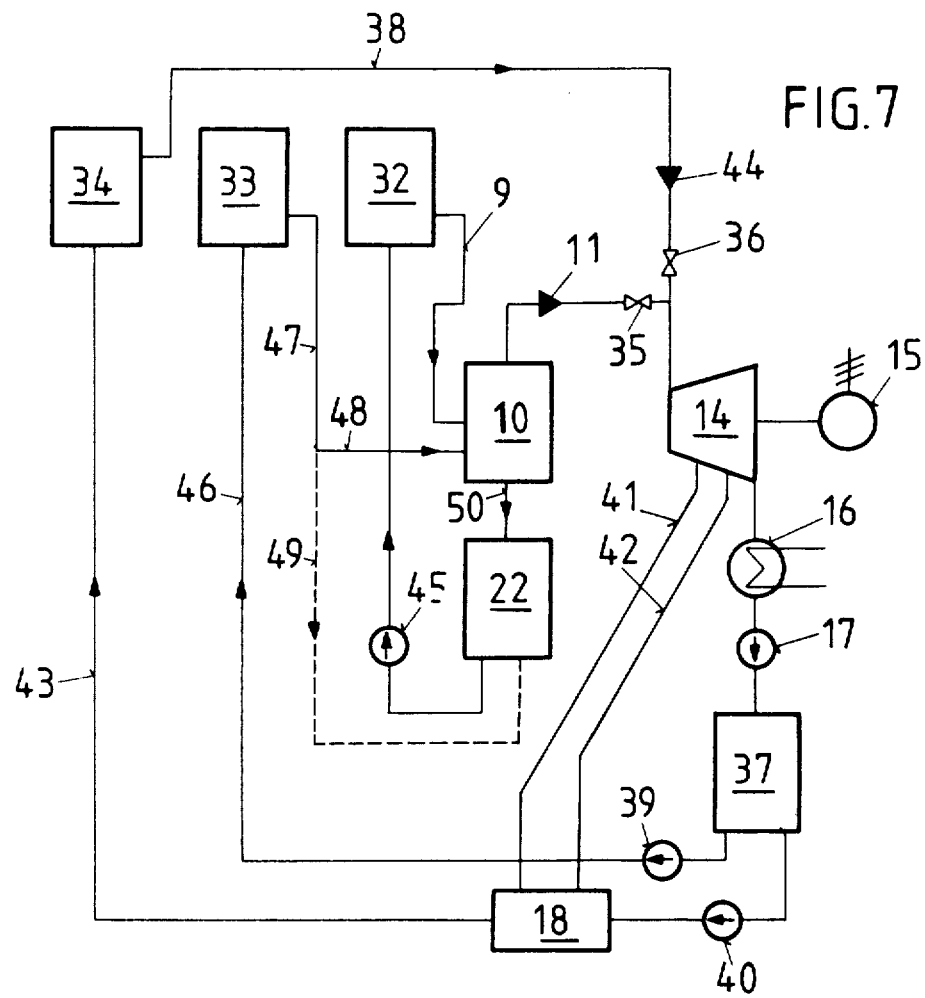
FIG. 7 illustrates a variant embodiment for direct steam removal from the heat storage.

With this installation as shown in FIG. 7 there is to be distinguished, apart from both of the circuits for the charging and discharging, a third circuit which, with the exception of the turbine 14, is defined by the elements 34, 38, 44, 36, 16, 17, 37, 40, 18 and 43, and such third circuit has common with the two other circuits the elements 16, 17 and 37. Since its heat receiver 34, when the sun is shining, directly generates steam without interposing in circuit a storage, it can be designated as a direct circuit or cycle.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A solar thermal steam turbine power plant comprising:
   a tower;
   a radiation receiver installed at and supported by said tower;
   means defining a heliostat field cooperating with the radiation receiver supported by the tower and containing reflectors for directing in a concentrated fashion the incident solar radiation onto the radiation receiver;
   a hot water storage operatively associated with the radiation receiver supported by the tower and serving for storage of a work medium which has been heated-up to a predetermined operating temperature;
   means for thermally charging and discharging the hot water storage;
   said radiation receiver having an elongate configuration and being subdivided into a multiplicity of partial receivers;
   said means for charging and discharging said hot water storage containing at least the following components:
   a throttle element arranged after said hot water storage for reducing the pressure of heated water constituting said work medium in order to generate steam;
   a turbine;
   a condenser and a condensate pump operatively connected with said turbine;
   said condenser condensing exhaust steam of said turbine into water;
   a pre-heater installation arranged following said condenser and said condensate pump;
   said turbine containing intermediate stage-bleed taps for bleeding steam used for heating said pre-heater installation;
   a cold water container for the reception of the water delivered by the condenser and water which has not been converted by the throttling action into steam;
   a water return flow line for withdrawing said water which has not been converted into steam, at a location following said throttle element, into the cold water container.

2. The solar thermal steam turbine power plant as defined in claim 1, wherein:
   said radiation receiver comprises a circular ring sector-shaped structure; and
   an exapnsion vessel arranged between the throttle element and the turbine for generating steam from hot water defining said work medium and received from said hot water storage.

3. The solar thermal steam turbine power plant as defined in claim 2, further including:
   a collecting line for interconnecting the heat receiver with the hot water storage;
   said collecting line serving for infeeding heated water to the hot water storage; and
   a return flow line directly connecting the cold water storage with the heat receiver and serving for feeding the water back into the heat receiver.

4. The solar thermal steam turbine power plant as defined in claim 3, further including:
   a heat exchanger;
   a return flow pump;
   said heat exchanger together with said heat receiver, said collecting line, said return flow pump and said return flow line forming a closed cycle which is separated from the remaining parts of the installation as concerns the work medium.

5. The solar thermal steam turbine power plant as defined in claim 4, wherein:
   said heat exchanger together with said hot water storage forms a structural unit.

6. The solar thermal steam turbine power plant as defined in claim 1, further including:
   three heat receivers defining first, second and third heat receivers;
   line means for connecting said first and second heat receivers directly with the hot water storage for charging said hot water storage;
   the removal of steam for the drive of the turbine being directly accomplished at said hot water storage;
   a valve provided between the throttle element and said turbine;
   a circuit for operating the power plant during sunshine;
   said circuit containing:
     said third heat receiver;
     a steam infeed line;
     a throttle element;
     a valve;
     a condensate pump;
     a pre-heater installation;
     a water return flow line leading to the third heat receiver; and
     said water return flow line being designated for the direct formation of steam.

7. The solar thermal steam turbine power plant as defined in claim 1, further including:
   three heat receivers defining first, second and third heat receivers;
   a line for connecting said first heat receiver directly with the cold water storage for charging the hot water storage;
   line means for connecting said second heat receiver with said cold water storage, so that the water pre-heated in the second heat receiver arrives at the hot water storage after flowing through the cold water storage and the first heat receiver;
   the removal of steam being accomplished directly out of said hot water sorage;
   a valve provided between the throttle element and the turbine;
   a circuit intended for operation of the power plant in the presence of sunlight;
   said circuit containing:
      said third heat receiver;
      a vapor infeed line;
      a throttle element;
      a valve;
      a condensate pump;
      a pre-heater installation;
      a water return flow line leading to the third heat receiver; and
      said third heat receiver being designed for direct formation of steam.

8. The solar thermal steam turbine power plant as defined in claim 1, wherein:
   said hot water storage is structured as a substantially torous-shaped ring container;
   said cooling tower having a jacket portion; and
   said torous-shaped ring container being arranged within the jacket portion of said cooling tower.

* * * * *